Dec. 28, 1965 W. D. HERRICK ET AL 3,225,954
INSULATED CONTAINER
Filed Aug. 30, 1963

INVENTORS
Wallace D. Herrick
Howard W. Christie
Dawson, Tilton, Fallon,
Lungmus & Alexander
Attorneys United States Patent Office 3,225,954
Patented Dec. 28, 1965

3,225,954
INSULATED CONTAINER
Wallace D. Herrick, Wichita, Kans., and Howard W. Christie, Kansas City, Mo., assignors to The Coleman Company, Inc., Wichita, Kans., a corporation of Kansas
Filed Aug. 30, 1963, Ser. No. 305,704
5 Claims. (Cl. 220—9)

This invention relates to an insulated container and more particularly to a double-walled insulated container with an evacuated space between the walls.

Heretofore the problem of providing a double-walled vacuum insulated container where one or both of the walls is formed of a plastic material has not been satisfactorily solved. As far as is known, no such insulated containers have been placed in commercial use, although such containers would have many advantages, especially in larger sizes such as one-half gallon and one gallon sizes. Insulated containers and jugs which depend on other insulating means than a high vacuum are in widespread commercial use, but it is well known that vacuum insulation is the most effective for maintaining liquids in a hot or cold state over prolonged periods of time.

The problem in utilizing a plastic material to form one or both of the walls of a vacuum insulated container centers around the fact that plastics are not sufficiently dense and impermeable to maintain the required high vacuum. For effective insulation a vacuum below $10^{-3}$ mm. Hg is required, and the preferred vacuum is in the range of $10^{-6}$ mm. Hg. Thus, even though plastic materials may be impervious for many purposes, the fact that they slowly transmit vapor and air makes the plastic materials unusable for enclosing a space maintained at a high vacuum.

One answer to the above problem with which the present invention is particularly concerned is that of providing the plastic wall with a metallic coating to eliminate air seepage through the plastic, or at least to reduce it to an insignificant level even in relation to the high vacuum which must be maintained for good insulation. The use of a metal coating on the plastic walls, such as an electroplated coating, leads to a further troublesome problem because it is difficult to achieve sufficient adherence between the plating and the plastic walls to permit a vacuum-tight joint to be formed between the walls. Such a joint becomes necessary because it is difficult to mold the inner and outer plastic walls in one piece, while at the same time providing for the plating of the internal wall surfaces and for the evacuation of the space between the walls. Consequently, it is desired to form the inner wall in one molding operation and the outer wall in another. The wall members are then separately plated on the inner surfaces which will face the evacuated space, and then united, for example, at their upper ends, to complete the enclosure of the space for evacuation.

The foregoing problems continue to be encountered to a comparable extent even though the outer wall is formed entirely of metal. The plastic inner wall will still require plating, and must be united by a joint assembly to the outer metal wall.

In joining either a metal wall to a plated plastic wall, or two plated plastic walls together, it will usually be preferred to employ a low temperature metallic braze or solder for forming the joint connection. In certain applications, other types of gas-impermeable bonding materials can be used. The choice of adhesive in itself does not solve the problem, since the bonding layer can provide no stronger joint than the strength of adherence of the plated coating on the plastic. If the coating separates from the plastic, the joint will fail, and air leakage will occur to the detriment of the vacuum.

It is therefore an object of the present invention to provide an insulated container which employs a plastic wall on at least one side of the insulating evacuated space, and which at the same time substantially overcomes the problems and difficulties discussed above. Further objects and advantages will be indicated in the following detailed specification.

This invention is illustrated in the accompanying drawing, in which—

Figure 1:
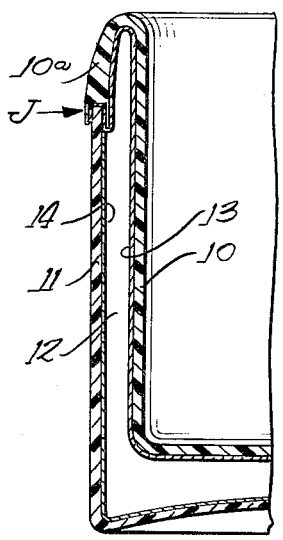
FIGURE 1 is an elevational view taken in vertical section of an insulated container constructed in accordance with the present invention, only the side and a portion of the bottom of the container being shown.

Looking first at the insulated container shown in FIGURE 1, it will be seen that it provides an inner wall 10 and an outer wall 11 with a space 12 therebetween. In the illustration given, the walls are generally cylindrical in horizontal cross-section, but other cross-sectional shapes can be used equally well. In the operation of the container, the space 12 will be evacuated to obtain a high vacuum, such as the vacuum less than $10^{-3}$ mm. Hg, or typically a vacuum of about $10^{-6}$ mm. Hg. This degree of vacuum is desired to maintain good insulating properties, against the transmission of heat by convection through the evacuated space.

In the illustration given, walls 10 and 11 are formed of a plastic material, such as a polyformaldehyde resin. Such plastics are commonly referred to as "acetal" plastics, and chemically are stabilized polymerized formaldehyde. The resins from which such plastics are formed are sold under the trade names of Delrin and Celcon. While an acetal plastic is preferred and has been found to give good results, other plastics can be used to form one or both of the walls, such as polystyrene, polypropylene, polycarbomate, polyamides, acrylics, rigid polyvinyl chloride, etc. Since the use of an injection molding procedure is preferred for forming the boundary wall members 10 and 11, it will usually be desirable to employ a thermoplastic material, which is adaptable to an injection molding procedure.

In order to reduce the permeability of the plastic walls 10 and 11, these walls are provided with metal coatings. Preferably, the coatings are on the surfaces of the walls facing the evacuated space 10. For example, in the illustration given, the wall 10 is provided with a metal coating 13, while the wall 11 is provided with a metal coating 14. Preferably the coatings 13 and 14 extend over the entire surfaces of the walls which adjoin the evacuated space, and also extend into the joint area between the walls, as will subsequently be discussed. Various types of metal coatings can be employed, but an electrodeposited metal coating is preferred. The coating may therefore be formed of any of the metals which can be readily electrodeposited, such as silver, nickel, copper, lead, etc. For the purpose of the present invention, a lead coating is particularly preferred. Since the walls 10 and 11 are repeatedly subjected to thermal stresses by the introduction of hot and/or cold liquids into the container, the walls 10 and 11 will be subject to repeated expansion and contraction. It has been found that a lead coating is more durable under such conditions than other types of metal coating. This appears to be due to the fact that a lead coating is softer and more ductile, and is not as subject to work hardening as other types of metal coatings. However, other types of metal coatings can be used with a somewhat lesser degree of success, or the metal coating can consist of several layers, where the layers are formed of different metals, such as the combination of a relatively thin inner coating of silver or copper with a thicker outer coating of lead, etc. The overall thickness of the metal coating should be sufficient to give a completely continuous layer, but the thickness can be as little as .1 to 1 mil. If desired, thicker coatings can be used up to 2–3 mils.

It will be understood that this invention is not directly concerned with techniques of electroplating as such, and therefore it is not believed necessary to set out details of electroplating procedures herein. By way of further illustration, however, reference is made to our copending application Serial No. 305,705, filed August 30, 1963, entitled "Process of Adhering Plating to a Plastic Body and Products Produced Thereby," which describes suitable electroplating procedures, and also the special electroplating procedure which it is desired to employ in at least the joint areas of the plastic walls, as will now be explained.

Figure 2:
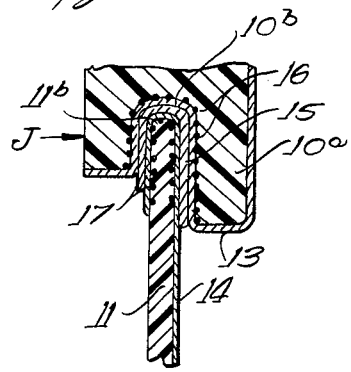
FIGURE 2 is a fragmentary enlarged view, taken in vertical section, of the joint area of the container of FIGURE 1.

The joint J, as indicated in FIGURE 1, and shown more clearly in FIGURE 2, is formed between the upper terminal and portions of the walls 10 and 11. In the illustration given, wall 10 at its upper end is provided with an outwardly and downwardly turned annular portion 10a which terminates in an annular recess 10b. This recess is adapted to receive the upper end portion 11b of the wall 11, as indicated more clearly in FIGURE 2. Preferably, a slip-fit is provided between these members, so that there is very little clearance between the surfaces of the wall and 11b and the opposing surfaces of the wall recess 10b. An adhesive material, such as a low temperature solder, is applied in the joint between the adjacent wall surfaces, thereby uniting the members, and forming the joint connection. This can be done by inserting the solder wire around the inner end of the joint cavity (e.g., annular recess 10b), and heating the joint to melt the solder and cause it to flow around the side of the joint. Some pressure may be applied to force the members together during soldering.

Figure 3:
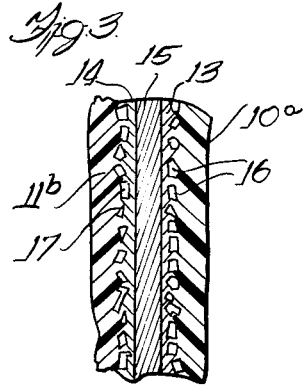
FIGURE 3 is an enlarged, fragmentary sectional view of the soldered joint of FIGS. 1 and 2.

As can be seen more clearly in FIGURE 2, the metal coating 13 extends around the lower end of the terminal wall portion 10a so as to completely cover the surfaces of the annular recess 10b. Similarly, the metal coating 14 on the wall 11 extends around the end portion 11b thereof so that it completely covers all of the wall surfaces which are received within the recess 10b. Consequently, the adhesive or bonding layer 15 unites the wall terminal portions 10a and 11b by adhering respectively to the metal coatings 13 and 14 within the joint area, as shown more clearly in FIG. 3.

In order to promote the adherence of the metal coatings to the plastic walls, the immediately underlying surface portions of the walls are provided with a layer of embedded metal particles, such as the particles 16 around the annular recess 10b, and the particles 17 around the end 11b of the wall 11. The metal particles are preferably embedded so that they have their inner end portions surrounded by and anchored to the plastic while also providing outer portions having metal surfaces free of the plastic, as shown more clearly in FIG. 3. The metal coatings 13 and 14 are therefore united more firmly to the portions of the plastic walls containing the embedded metal particles, and this is particularly desirable in the joint area of the walls, since the joint will be subjected repeatedly to mechanical and thermal stresses, which might have a tendency to cause the metal coatings to separate from the walls.

This invention is not directly concerned with the method of embedding the metal particles. Generally, the metal particles are preferably embedded while the plastic is in a fluid state, or at least in a soft, tacky condition. This permits the particles to be anchored to the plastic walls, while still permitting their outer faces or outer end portions to be attached to the metal coating. Several procedures for forming the plastic walls with the embedded metal particles are described in the above-cited copending application Serial No. 305,705. In one preferred procedure, the metal particles are embedded during an injection molding operation, and are held in place during the injection of the plastic material by an electromagnetic means.

It will be understood that a wide variety of metal particles can be employed in the wall surfaces of the joint areas. The metal particles, of course, should be in a finely-divided condition, that is, in the form of a powder, and the metal should be stable and substantially inert with respect to the plastic into which it is embedded. The alkali and alkaline earth metals are not desirable, but generally any of the metals at least as heavy as aluminum can be used, including iron, copper, zinc, silver, gold, chromium, molybdenum, manganese, lead, nickel, aluminum, etc. Alloys of such metals, of course, are also suitable. Where the method of the cited copending application is employed, a preferred subclass of metals and metal alloys comprise those of the iron family and alloys thereof which are capable of being magnetically positioned. Iron itself is therefore particularly preferred. Metal particles in the size range of 80 to 120 mesh (American Standard Screens) give particularly good results, although particles up to 40 mesh or down to 150 mesh can be used.

It will be understood that the dimensions of the components of the insulated container are not critical. However, by way of illustration, the following dimensions may be set out. The walls 10 and 11 may have an approximate thickness of 0.05 to 0.06 inch, while the metal proximate thickness of 0.5 to 0.6 inch, while the metal coatings 13 and 14 may have a thickness of about one mil. The metal particles, which may be iron particles, such as the particles 16 and 17, may have a mesh size averaging about 100 mesh (American Standard Screen size). The walls themselves may be formed of a polyformaldehyde resin, such as the resins sold under the trade names of Delrin and Celcon. The metal coatings 13 and 14 would be formed of lead, which would be electrodeposited by means of a suitable pretreating and electrodeposition procedure, as described in the cited copending application. The adhesive layer 15 would be formed of a low temperature solder, having a melting point below the point at which the plastic material of the walls loses mechanical strength. For example, where the walls are formed of a polyformaldehyde resin, a Cerro-Cast solder alloy (lead-tin-bismuth) having a M.P. of 285° F. is quite suitable. "Cerro-Cast" is manufactured by Cerro Corporation, of New York City, N.Y. Other lead solders can also be used, such as a eutectic tin-lead solder, Rose's metal, Wood's metal, etc.

Figure 4:
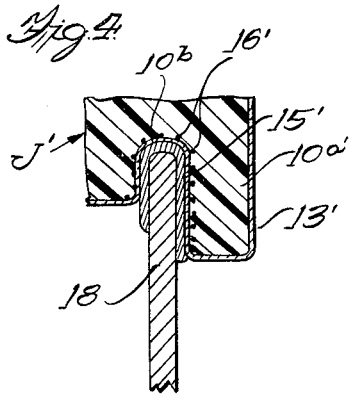
FIGURE 4 is a view similar to FIGURE 2, being a section through a joint area illustrating a modified construction wherein the outer wall is formed of metal.

In FIGURE 4 there is shown a modification of the joint structure of FIG. 2. The modified joint J' includes a number of corresponding elements which have therefore been given the same numbers except that the numbers have been primed. The principal difference between the joint of FIG. 4 and that of FIG. 2 is that the outer wall, designated by the number 18, is formed entirely of metal, instead of being a plated plastic wall. The inner wall 10, and its end portion 10a, is identical to that of FIG. 2. The inner wall 10' and its terminal end portion 10a' is identical to that of FIG. 2, and therefore provides an annular recess 10b' which receives the upper end of the metal outer wall 18. The surface of the end 10a' including the recess surfaces 10b' are coated with the metal layer 13', which whitin the recess is united to the plastic by means of the embedded metal particles 16'. The adhesive layer 15' can be formed in the same way as the adhesive layer 15, and may consist of a low temperature solder or braze. The outer wall 18 may be formed of any suitable metal, such as aluminum or steel. Preferably, wall 18 will be formed of aluminum.

While in the foregoing specification this invention has been described in relation to specific embodiments thereof and many details have been set forth for purpose of illustration, it will be apparent to those skilled in the art that the invention is susceptible to additional embodiments and that many of the details described herein can be varied considerably without departing from the basic principles of the invention.

We claim:

1. In an insulated container having an inner and an outer wall with an evacuated space therebetween, at least one of said walls being formed of a plastic material, and opposed end portions of said walls forming a joint, the improvement comprising a vacuum-retaining, electrodeposited metal coating covering at least one side of said one plastic wall opposite said evacuated space so that said one wall is capable of maintaining a high vacuum, said metal coating on said one wall extending into said joint between the opposed surfaces of said end portions, the end portion of said one plastic wall having metal particles imbedded in the surface thereof beneath said metal coating for promoting the adherence of the metal coating to the plastic surface, and a solder layer in said joint between the said opposed surfaces, said solder layer being bonded to said metal coating for connecting and sealing said joint, the vacuum maintained in said space being higher than $10^{-3}$ mm. Hg.

2. The insulated container of claim 1 in which both of said walls are formed of a plastic material, and in which the entire surface of each of said walls facing said evacuated space has a vacuum-retaining, electrodeposited metal coating thereon, said metal coatings extending into said joint between the opposed surfaces of said end portions, and said end portions having metal particles imbedded in the surfaces thereof beneath the said metal coatings thereon for promoting the adherence of the metal coating to the plastic surface thereof, and said solder layer in said joint being bonded to both of said metal coatings.

3. The insulated container of claim 1 in which said metal coatings are formed of lead, said plastic wall is formed of a polyformaldehyde resin, and said metal particles are formed of iron.

4. In an insulated container having an inner and an outer wall with an evacuated space therebetween, each of said walls being formed of a thermoplastic material, and opposed end portions of said wall forming a joint, the improvement comprising a vacuum-retaining, electrodeposited metal coating covering the entire surface of each of said walls facing said evacuated space so that said walls are capable of maintaining a high vacuum, the said end portion of one of said walls providing an annular recess, the said end portion of the other of said walls extending into said annular recess to form said joint, said metal coatings extending onto the opposed surfaces of said end portions in said joint, metal particles imbedded in the opposed plastic surfaces of said wall end portions in said joint beneath the said metal coatings thereon, said metal particles extending beyond the plastic of said surfaces into adherent contact with the respective metal coating on each of said end portions, and a solder layer in said joint between said opposed surfaces and the said metal coatings thereon, said solder layer being bonded to said metal coatings for connecting and sealing said joint, the vacuum maintained in said space being higher than $10^{-3}$ mm. Hg.

5. The insulated container of claim 4 in which said coatings are formed of lead, said plastic walls are formed of a polyformaldehyde resin, and said metal particles are formed of iron.

References Cited by the Examiner

UNITED STATES PATENTS

| | | | |
|---|---|---|---|
| 1,672,904 | 6/1928 | Randall | 220—9 |
| 2,538,524 | 1/1951 | Joseph | 220—9 |
| 2,643,021 | 6/1953 | Freedman | 220—9 |
| 2,934,456 | 4/1960 | Schutt | 156—279 |
| 3,069,041 | 12/1962 | Musso et al. | 220—9 |

THERON E. CONDON, *Primary Examiner.*